(12) United States Patent
Andrei et al.

(10) Patent No.: US 10,194,376 B2
(45) Date of Patent: Jan. 29, 2019

(54) SYSTEM AND METHOD FOR WIRELESS NETWORK ACCESS CONTROL

(71) Applicant: Telefonaktiebolaget LM Ericsson (publ), Stockholm (SE)

(72) Inventors: Diana Andrei, Linköping (SE);
Rasmus Axén, Linköping (SE);
Elisabeth Hansson, Linköping (SE);
Stefan Johansson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 23 days.

(21) Appl. No.: 15/106,356

(22) PCT Filed: Dec. 20, 2013

(86) PCT No.: PCT/SE2013/051594
§ 371 (c)(1),
(2) Date: Jun. 20, 2016

(87) PCT Pub. No.: WO2015/094062
PCT Pub. Date: Jun. 25, 2015

(65) Prior Publication Data
US 2016/0337941 A1    Nov. 17, 2016

(51) Int. Cl.
*H04W 48/08* (2009.01)
*H04W 48/14* (2009.01)
(Continued)

(52) U.S. Cl.
CPC ............. *H04W 48/08* (2013.01); *H04W 8/20* (2013.01); *H04W 48/14* (2013.01); *H04W 36/14* (2013.01); *H04W 36/38* (2013.01); *H04W 48/18* (2013.01)

(58) Field of Classification Search
CPC ........ H04W 48/08; H04W 8/20; H04W 48/14
See application file for complete search history.

(56) References Cited

U.S. PATENT DOCUMENTS 8,437,288 B2    5/2013  Edge et al.
2006/0116125 A1  6/2006  Buckley et al.
(Continued)

FOREIGN PATENT DOCUMENTS

EP          2437546 A1 *  4/2012  ............ H04W 36/14
WO     2005060294 A1      6/2005
WO     2007038799 A2      4/2007

*Primary Examiner* — Siming Liu
(74) *Attorney, Agent, or Firm* — Murphy, Bilak & Homiller, PLLC

(57) ABSTRACT

The present disclosure relates to a method in a radio access controller in a first radio access network for providing access control in a wireless network comprising the first radio access network arranged to operate according to a first radio access technology and a second radio access network arranged to operate according to a second radio access technology. The method comprises the steps of receiving an access request (Si3, Si4) originating from a wireless device, said access request comprising wireless device related information including information related to a global cell identity; assessing (P4) the access request based on the received wireless device related information, a throughput related value for the first radio access technology and a throughput related value for the second radio access technology, and responding (Si5, Si6) to the access request based on the assessment. The present disclosure further relates to a method in a radio access controller in a second radio access network, radio access controller, a method in a wireless device and a wireless device.

18 Claims, 5 Drawing Sheets

(51) Int. Cl.
    *H04W 8/20*          (2009.01)
    *H04W 48/18*        (2009.01)
    *H04W 36/14*        (2009.01)
    *H04W 36/38*        (2009.01)

(56) References Cited

U.S. PATENT DOCUMENTS

| | | |
|---|---|---|
| 2009/0061925 A1* | 3/2009 | Finkelstein ....... H04M 1/72522 455/552.1 |
| 2009/0132675 A1* | 5/2009 | Horn ....................... H04W 8/26 709/207 |
| 2010/0008235 A1* | 1/2010 | Tinnakornsrisuphap .................... H04L 29/12264 370/241 |
| 2010/0130210 A1 | 5/2010 | Tokgoz et al. |
| 2010/0159934 A1 | 6/2010 | Forssell et al. |
| 2011/0320588 A1 | 12/2011 | Raleigh |

* cited by examiner

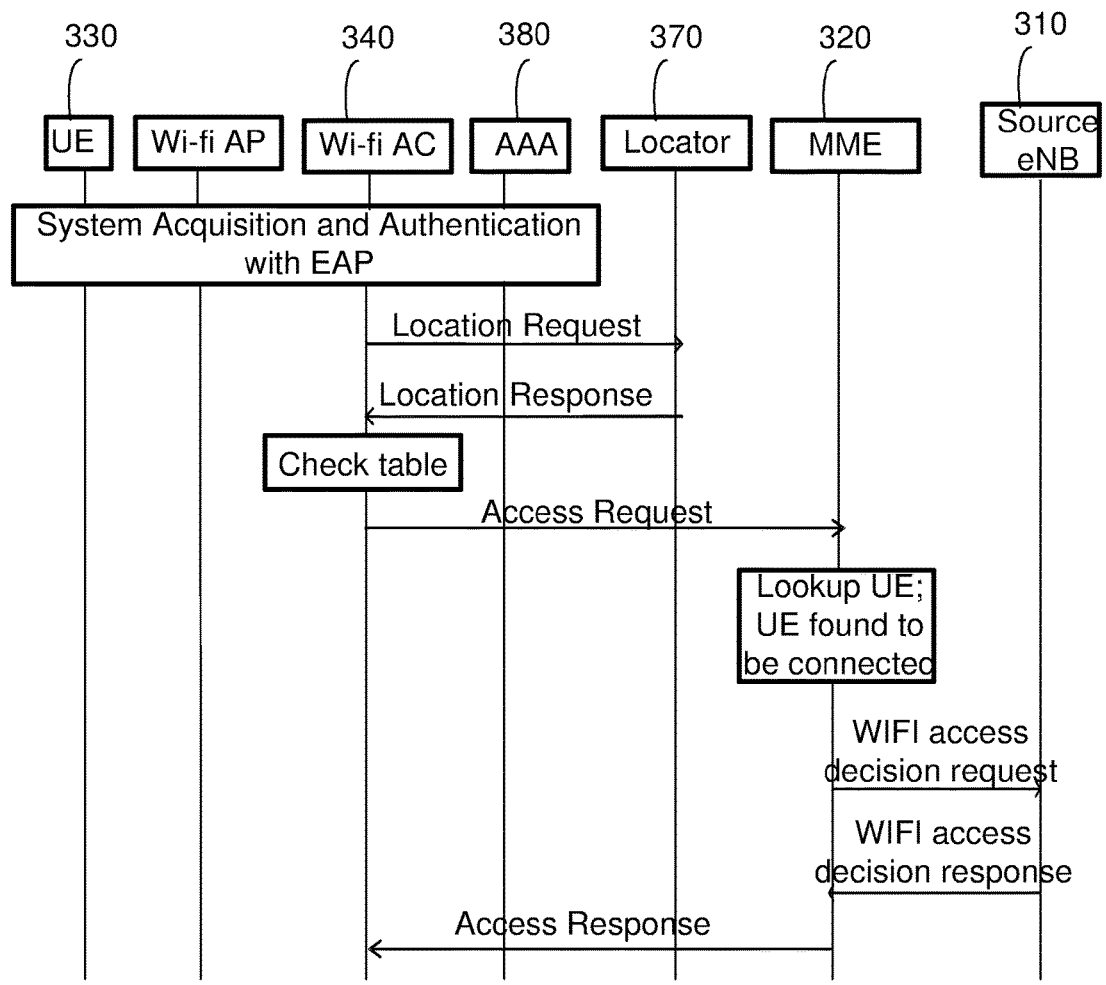
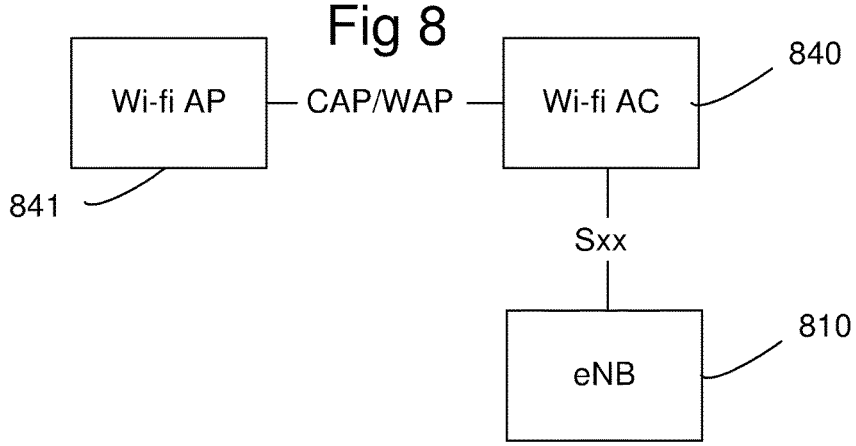

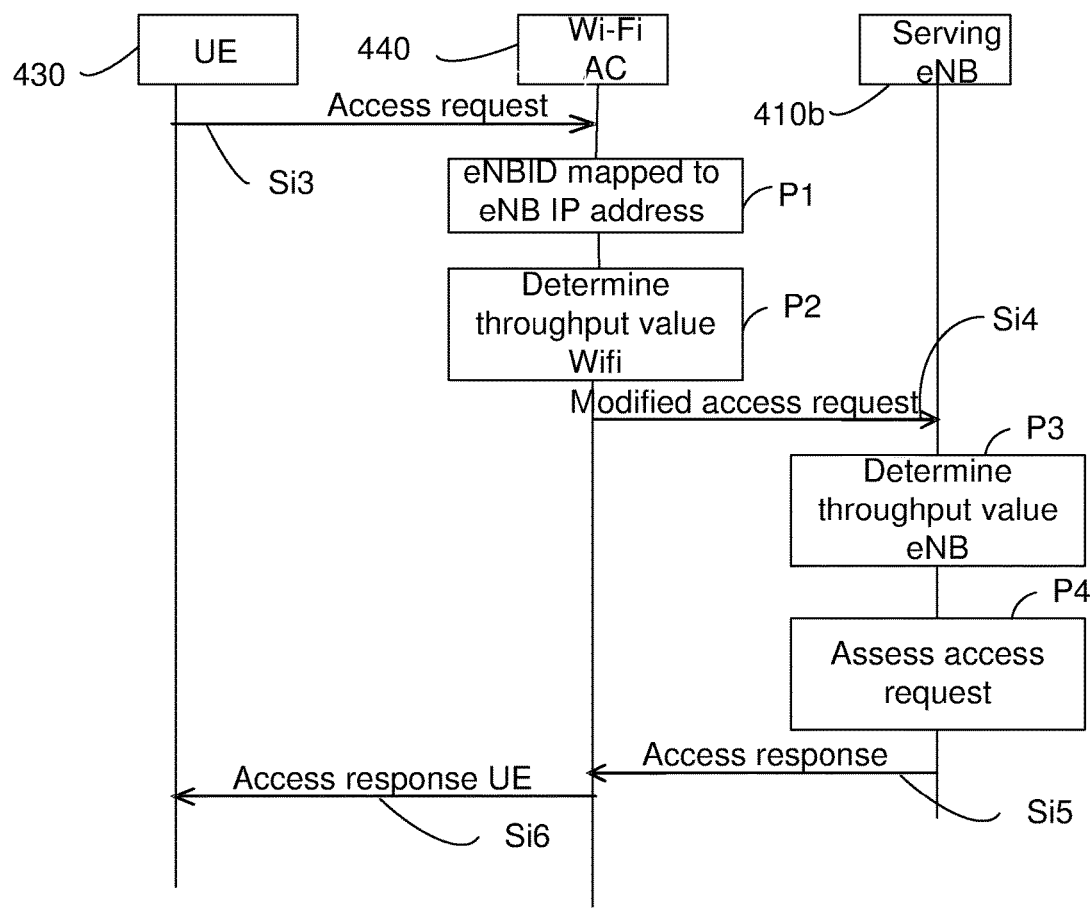
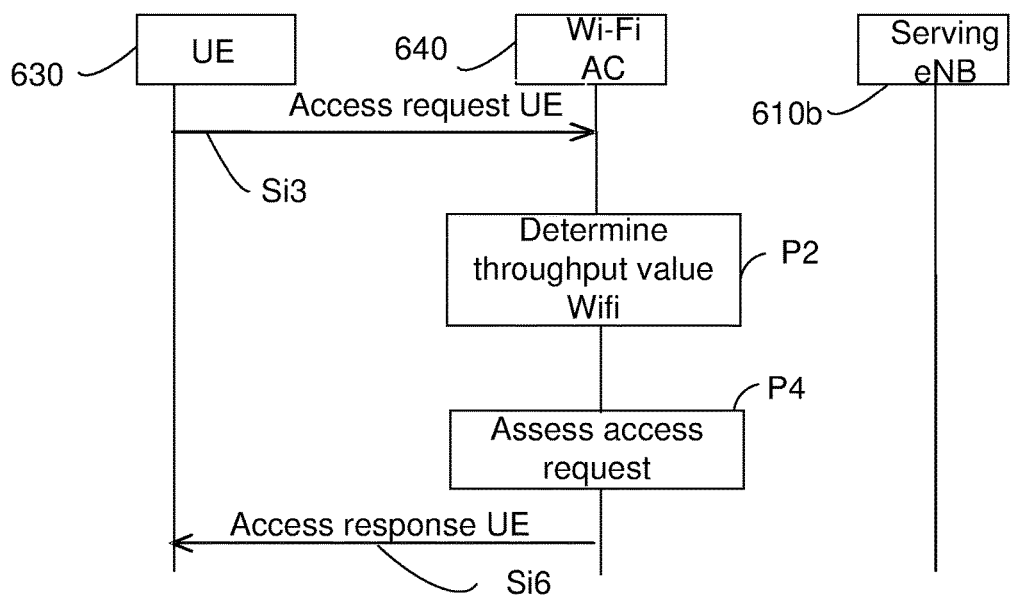

SYSTEM AND METHOD FOR WIRELESS NETWORK ACCESS CONTROL

TECHNICAL FIELD

The present disclosure relates to a method in a radio access controller in a first radio access network for providing access control in a wireless network comprising the first radio access network arranged to operate according to a first radio access technology and a second radio access network arranged to operate according to a second radio access technology.

The present disclosure further relates to a radio access controller in a first radio access network for providing access control in a wireless network comprising the first radio access network arranged to operate according to a first radio access technology and a second radio access network arranged to operate according to a second radio access technology.

The present disclosure further relates to a method in a radio access controller in a second radio access network and a radio access controller in said second radio access network.

The present disclosure further relates to a method in a wireless device for providing access control in a wireless network and a wireless device.

BACKGROUND

The Evolved Universal Terrestrial Radio Access Network, E-UTRAN, architecture is an example of a cellular radio system. Each eNB controls one or more cells. The eNBs are interconnected with each other via the X2 interface. The eNBs are connected via the S1 interface to an Evolved Packet Core, EPC, and more specifically to a Mobility Management Entity, MME, and Serving Gateway, S-GW.

A UE identifies a cell by use of a signal sequence from an enumerated set. In Long Term Evolution, LTE, there are 504 signal sequences, each associated to a Physical Cell Identity, PCI. A cell can also be identified by the Evolved Cell Global Identifier, ECGI. The ECGI consists of the Public Land Mobile Network, PLMN, and the E-Utran Cell identifiers. The E-Utran Cell identifier is divided into evolved Node B identity, eNB ID, and identifier of cells served by the eNB. Both PCI and ECGI are broadcasted by the cell. The ECGI uniquely identifies the cell within all LTE networks.

In a network where Wi-Fi Access Controllers, ACs, and Wi-Fi Access Points, APs, are deployed in an operator's network together with 3GPP nodes, a User Equipment, UE, supporting Wi-Fi will try to connect to a Wi-Fi AP as soon as the UE senses Wi-Fi coverage.

Given that the UE is in a CONNECTED state or camping—IDLE state—in an LTE cell, the decision to connect to Wi-Fi could be made wrongly/too early by the UE, since user experience and quality of UE data transmission can be better in the LTE cell.

Therefore, a network based solution, where the Wi-Fi AC considers the user experience of the UE in the Wi-Fi cell compared to the LTE cell(s) when deciding whether to admit the UE in Wi-Fi is needed in order to direct the UE to the place where the user experience is best.

One solution that helps the Wi-Fi AC to make a decision on admitting the UE or not into Wi-Fi, is based on average quality information. Then, a Wi-Fi Received Signal Strength Indication, RSSI, admission threshold tuning algorithm is used. The algorithm is based on average throughput measures in the Wi-Fi cell and the covering LTE cells collected via Operation Supports System, OSS. The idea is to balance the throughput in the two technologies and adjust the RSSI admission threshold in Wi-Fi accordingly. When throughput in Wi-Fi is better than in covering cells, then UEs are admitted to Wi-Fi. When throughput in Wi-Fi is not better than in covering cells, then admission threshold is increased and more UEs are rejected so that they rather stay in LTE.

In this solution the Wi-Fi AC, that takes the decision about admitting UE to Wi-Fi, does not know the serving cell of the UE.

Another proposal is to use average quality information in covering LTE cells gathered by letting the eNBs themselves send the information to the Wi-Fi AC via RAN Information Management, RIM. When the UE requests access to Wi-Fi, it also reports the UE's serving cell. The Wi-Fi AC will check the average quality information received earlier for the cell reported by the UE. If the quality in Wi-Fi is better, the UE is admitted.

The main problem with this solution is scalability issues with RIM but also that it uses average cell quality information.

An improved solution is to base the decision on UE specific quality information instead of average quality information. This solution however uses a new centralized entity that handles a UE location database. Each time a UE changes eNB this entity is updated by the MME with the new UE location. When a UE requests access to Wi-Fi, the Wi-Fi AC has to interrogate this central database about the UE's last known serving eNB. After a signalling round with this eNB, the Wi-Fi AC finds whether the UE is IDLE or CONNECTED. If it is CONNECTED, UE specific quality information is obtained from the given eNB. If UE is IDLE then a new signalling round is needed to obtain average quality information in covering cells. If quality in Wi-Fi cell is better, the UE is admitted to Wi-Fi.

Another proposal is to use the centralized locator entity, but to let the LTE MME update the locator with MME information only when the UE changes MME. The Wi-Fi AC will find the needed quality information in a few signalling rounds. The Wi-Fi AC asks the MME registered in the locator about the UE's whereabouts. Further, the MME via the S1 interface communicates with the involved eNBs to find either UE specific quality information (when UE is CONNECTED) or average quality information (when UE is IDLE). This solution involves extra signalling since each MME may need to communicate with several eNBs for each specific UE request.

SUMMARY

One object of the present disclosure is to provide decentralized access control.

This has in accordance with one option been achieved by means of a method in a radio access controller in a first radio access network for providing access control in a wireless network comprising the first radio access network arranged to operate according to a first radio access technology and a second radio access network arranged to operate according to a second radio access technology. The method comprises the steps of receiving an access request originating from a wireless device, said access request comprising wireless device related information including information related to a global cell identity, assessing the access request based on the received wireless device related information, a throughput related value for the first radio access technology and a throughput related value for the second radio access technology, and responding to the access request based on the assessment.

Thus, before a requested network is accessed, assessment is made regarding which network is preferred. The access request is assessed based on both the throughput related value for the first radio access technology and the throughput related value for the second radio access technology. This is achieved without involvement of a centralized locator and/or MME. Further, the information available in the wireless device is used in an improved manner. Moreover, efficient signalling paths are provided.

In one option, the step of assessing comprises communication with the second radio access network. Thus, the first and the second radio access networks are communicating in order to do the assessment while a centralized locator and/or MME is not involved.

In one option, the access request originating from the wireless device further comprises the throughput related value for the second radio access technology. When the wireless device provides this information, a minimum of signalling is involved between network entities.

In one option, the step of assessing the access request comprises a step of transmitting a request for secondary radio access network information from the secondary access network, and a step of receiving a response to the request for secondary radio access network information from the secondary access network, wherein said secondary radio access network information comprises the throughput related value for the second radio access technology.

One advantage of involving the second radio access node in the throughput computation (and not for example letting only the wireless device to compute the throughput) is that a better estimate can be made since the access network has more computation power and can store more data samples to help the computation. Further, the second radio access node can estimate a "future-proof" throughput based on the stored data and accordingly not only on momentary quality values.

In one option, the step of assessing the access request comprises comparing the throughput related value for the first radio access technology with the throughput related value for the second radio access technology. Thereby, access control is achieved such that a presently used network is not abandoned until it decreases below the throughput values for the requested network, or based on another throughput relation between the present and requested networks.

In one option, the first radio access network is a Wi-Fi network. The Wi-Fi network provides for transmission at a high rate. The Wi-Fi network can be used when available to increase capacity of the network.

A Wi-Fi network is defined as a local area-based network system operating according to a standard from an IEEE 802.11 standards family.

In one option, the wireless device related information comprises information related to a global serving cell identity, the method further comprising a step of mapping the global serving cell identity to a corresponding serving node IP address for Wi-Fi.

In one option, the second radio access network is GSM or a WCDMA radio network or an LTE network.

In one option, the first radio access network is GSM or a WCDMA radio network or an LTE network.

In one option, the throughput related value for the first radio access technology is determined as an average user throughput value based on the information related to the global cell identity.

One advantage is that the wireless device knows in which cell it is residing in both CONNECTED and IDLE mode. Thus, an adequate average user throughput value can be provided in both modes.

In one option, the throughput related value for the first radio access technology is determined as a user specific throughput value based on the information related to the global cell identity and a unique identity of the wireless device.

The average quality information offers the same decision support to the radio access controller for both a wireless device in CONNECTED mode as well as a wireless device in IDLE mode, namely average wireless device quality. However, when the global cell identity is a serving cell, it is advantageous for a wireless device in connected mode, i.e. a user that actively performs some data transfer operation, to provide access control so that the similar performance/quality offered in the other network is similar to that the wireless device currently experiences in the serving cell. This is very difficult to do if the performance/quality information from the serving cell is an average value that does not consider e.g. the channel quality for the specific wireless device. In leveraging wireless device specific quality information when the wireless device is CONNECTED improves the decision base for the radio access controller. Further, this is achieved at a low cost in terms of signalling.

The present disclosure further relates to a method in a radio network controller in a second radio access network for providing access control in a wireless network comprising a first radio access network arranged to operate according to a first radio access technology and the second radio access network arranged to operate according to a second radio access technology. The method comprises the steps of receiving an access request from the wireless device, said access request comprising wireless device related information including information related to a global cell identity, determining a throughput related value for the second radio access technology for the wireless device based on the received wireless device related information, modifying the received access request so as to comprise the throughput related value for the second radio access technology from the wireless device, transmitting the modified access request to the first radio access network, and receiving a response to the modified access request, said response comprising an indication about whether access to the first or the second radio access network is preferred.

In one option, the second radio access network is a Wi-Fi network.

The present disclosure further relates to a radio access controller in a first radio access network. The radio access controller is arranged to provide access control in a wireless network comprising the first radio access network arranged to operate according to a first radio access technology and a second radio access network arranged to operate according to a second radio access technology. The radio access controller comprises: a receiver arranged to receive an access request originating from a wireless device, said access request comprising wireless device related information including information related to a global cell identity; a processor arranged to assess the access request based on the received wireless device related information, a throughput related value for the first radio access technology and a throughput related value for the second radio access technology, and to form a response to the access request based on the assessment and a transmitter arranged to transmit the response to the access request.

In one option, the radio access controller is further arranged to communicate with the second radio access network so as to provide the throughput value for the second radio access technology.

In one option, the processor is arranged to form a request for secondary radio access network information from the secondary access network, the transmitter is arranged to transmit the formed request for secondary radio access network information, and the receiver is arranged to receive a response to the request for secondary radio access network information from the secondary access network, wherein said secondary radio access network information comprises the throughput related value for the second radio access technology.

In one option, the processor is arranged to compare the throughput related value for the first radio access technology with the throughput related value for the second radio access technology so as to assess the access request.

In one option, the radio access controller is a Wi-Fi access controller.

In one option, the radio access controller is an evolved Node B, eNB.

In one option, the radio access controller is a Radio Network Controller, RNC.

The present invention further relates to a radio network controller for a second radio access network for providing access control in a wireless network comprising a first radio access network arranged to operate according to a first radio access technology and the second radio access network arranged to operate according to a second radio access technology. The radio network controller comprises a receiver arranged to receive an access request from the wireless device, said access request comprising wireless device related information including information related to a global cell identity; a processor arranged to determine a throughput related value for the second radio access technology for the wireless device based on the received wireless device related information, and to modify the received access request so as to comprise the throughput related value for the second radio access technology from the wireless device, a transmitter arranged to transmit the modified access request to the first radio access network, and a receiver arranged to receive a response to the modified access request, said response comprising an indication about whether access to the first or the second radio access network is preferred.

In one option, the radio a network controller is a Wi-Fi access controller.

The present disclosure further relates to a method in a wireless device for providing access control in a wireless network comprising a primary access network and a Wi-Fi network. The method comprises the steps of detecting presence of the Wi-Fi network, forming an access request comprising wireless device related information including information related to a global cell identity upon detection of the Wi-Fi network, transmitting the access request to a Wi-Fi controller of the detected Wi-Fi network, and receiving an access response from the Wi-Fi controller comprising information identifying whether the Wi-Fi network or the primary access network is preferred.

In one option, the wireless device related information comprises a unique identity of the wireless device such as a Cell Radio Network Temporary Identifier, C-RNTI, and/or a short Medium Access Control Identity, MAC-I.

In one option, the wireless device related information comprises a throughput related value for the primary network The present disclosure further relates to a wireless device. The wireless device comprising a detecting element arranged to detect presence of a Wi-Fi network; a processor arranged to form an access request comprising wireless device related information including information related to a global cell identity; a transmitter arranged to transmit the access request to a Wi-Fi controller of the detected Wi-Fi network, and a receiver arranged to receive an access response from the Wi-Fi controller.

In one option, the wireless device related information comprises a unique identity of the wireless device such as a Cell Radio Network Temporary Identifier, C-RNTI, and/or a short Medium Access Control Identity, MAC-I.

In one option, the wireless device related information comprises a throughput related value for the primary network.

BRIEF DESCRIPTION OF THE DRAWINGS

FIG. 3 shows a signal scheme illustrating a second example of a PRIOR ART sequence for deciding if a User Equipment shall be granted to Wi-Fi cell.

FIG. 4 shows a signal scheme illustrating a first example of a signalling sequence deciding if a User Equipment shall be granted to Wi-Fi cell.

FIG. 6 shows a signal scheme illustrating a third example of a signalling sequence deciding if a User Equipment shall be granted to Wi-Fi cell.

FIG. 8 is a block scheme illustrating an interface between an LTE network and a Wi-Fi network.

DETAILED DESCRIPTION

Figure 1:
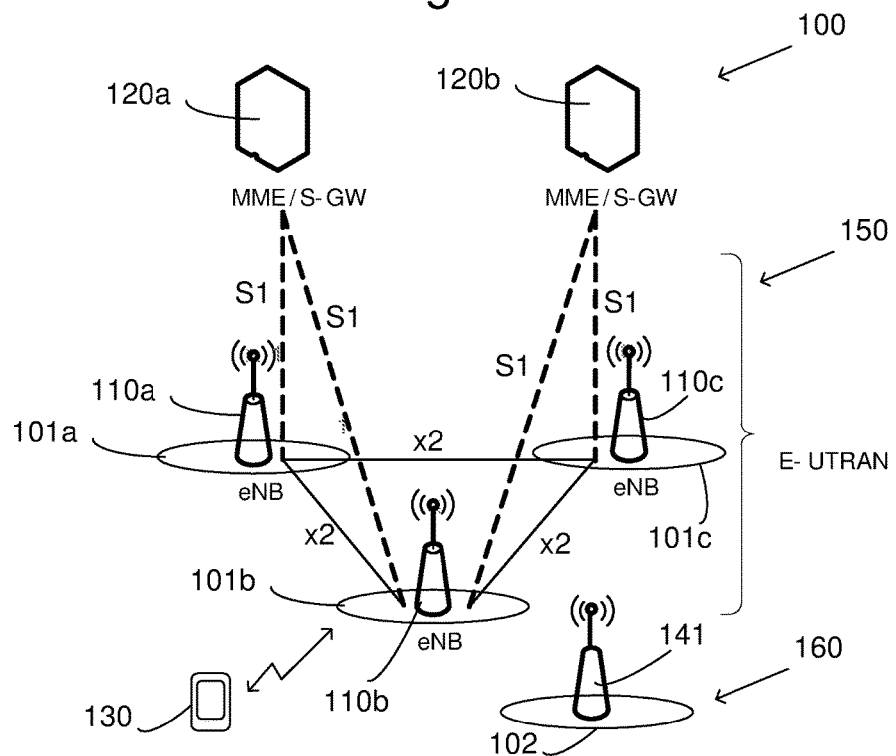
FIG. 1 shows schematically an example of a wireless network.

In FIG. 1, a wireless network 100 comprises an Evolved Universal Terrestrial Radio Access Network, E-UTRAN, 150 and a Wi-Fi network 160. The E-UTRAN 150 comprises a plurality of evolved Node Bs, eNBs, 110a, 110b, 110c. Each eNB 110a, 110b, 110c is arranged to control one or a plurality of cells 101a, 101b, 101c. Each cell is associated to a local cell identity. The local cell identity is in one example a Physical Cell Identity, PCI. The eNBs 110a, 110b, 110c are interconnected with each other via a first interface X2. The eNBs 110a, 110b, 110c are connected via a second interface S1 to an Evolved Packet Core, EPC. The EPC comprises one or a plurality of Mobility Management Entities, MMEs, and at least one Serving Gateway, S-GW, 120a, 120b. A User Equipment, UE, 130 has access to the E-UTRAN, 150 via a source cell 101b. The UE 130 is IDLE or CONNECTED. Handover to one of the other cells 101a, 101c can be performed. The UE can also request access to the Wi-Fi network 160. In the simplified illustration of FIG. 1, the Wi-Fi network comprises a Wi-Fi Access Point, Wi-Fi AP, serving a Wi-Fi cell 102 and. The Wi-Fi AP is in communication with a Wi-Fi Access Controller, Wi-Fi AC (not shown).

Figure 2:
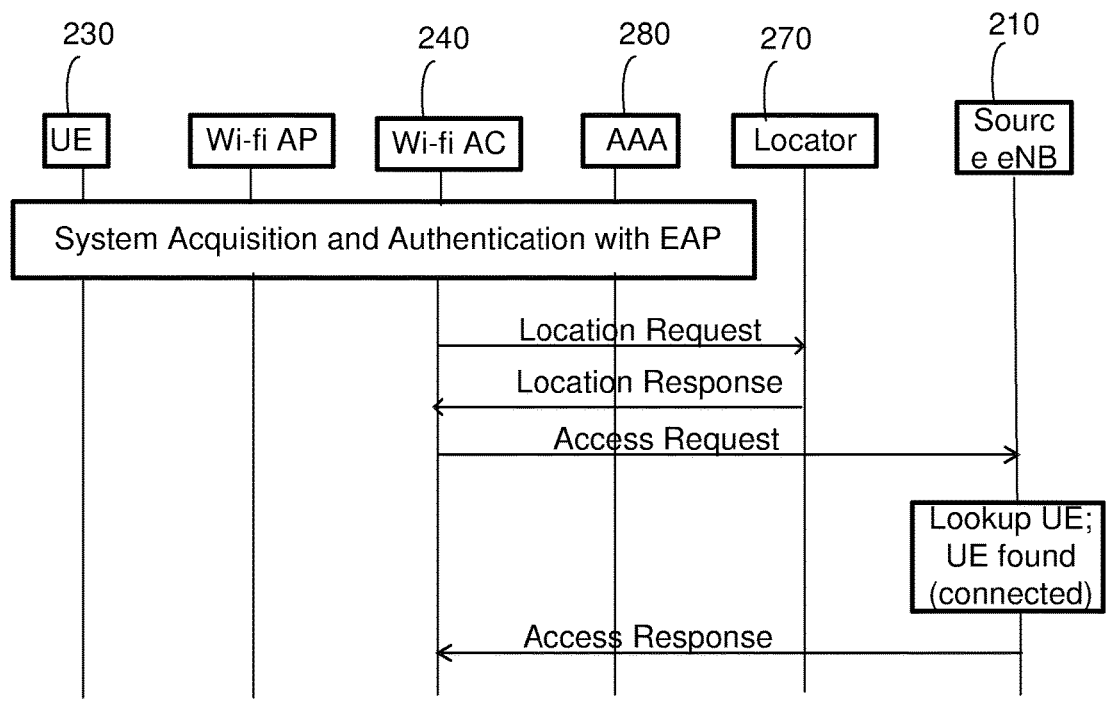
FIG. 2 shows a signal scheme illustrating a first example of a PRIOR ART sequence for deciding if a User Equipment shall be granted to Wi-Fi cell.

In FIG. 2 a signal scheme is shown illustrating a first example of a PRIOR ART sequence for deciding if a User Equipment shall be granted to Wi-Fi cell. A Wi-Fi Access controller, Wi-Fi AC 240 receives an Authentication Request from a UE 230. The Wi-Fi AC 240 authenticates the UE with use of an authentication, authorization and accounting, AAA, server 280. In the illustrated example, system acquisition and authentication is performed using an Extensible Authentication Protocol, EAP. If the AAA server 280 sends a positive authentication response, the Wi-Fi AC 240 sends positive authentication response to the UE. This PRIOR ART solution helps the Wi-Fi AC, 240 to make a decision on admitting the UE or not into Wi-Fi, based on UE specific quality information. This solution uses a centralized entity, herein denoted locator 270, which handles a UE location database. Each time a UE changes evolved Node B, eNB, 210, the locator 270 is updated by the MME with the new UE location. When a UE requests access to Wi-Fi, the Wi-Fi AC 240 interrogates the locator 270 about the UE's last known serving eNB 210. After a signalling round with the eNB 210 indicated to be the last known serving eNB 210 in a response from the locator 270, the Wi-Fi AC 240 finds whether the UE is IDLE or CONNECTED. If it is CONNECTED, UE specific quality information is obtained from the given eNB. If UE is IDLE then a new signalling round is done to obtain average quality information in covering cells. If quality in Wi-Fi cell is better, the UE is admitted to Wi-Fi.

This signalling scheme is costly in terms of the signalling performed to find the UE's location from locator. If the locator is a new node in the network, the amount of signalling increases even more because the UE's location must be communicated separately to the locator as soon as the UE changes eNB. In addition, the cost of implementing such a solution becomes even higher due to the new node. There are also scalability problems that need to be addressed since many UE requests require response from the same locator/MME.

In FIG. 3, a signal scheme illustrating a second example of a PRIOR ART sequence for deciding if a User Equipment shall be granted to Wi-Fi cell is illustrated. A Wi-Fi Access controller, Wi-Fi AC 340 receives an Authentication Request from a UE 330. The Wi-Fi AC 340 authenticates the UE with use of an authentication, authorization and accounting, AAA, server 380. In the illustrated example, system acquisition and authentication is performed using an Extensible Authentication Protocol, EAP. If the AAA server 380 sends a positive authentication response, the Wi-Fi AC 340 sends positive authentication response to the UE. This PRIOR ART solution uses a centralized locator entity, herein denoted locator 370, but lets the Mobility Management Entity, MME, 320 update the locator 370 with MME information only when the UE 330 changes MME. A Wi-Fi Access Controller, Wi-Fi AC, 240, will finds the quality information in a few signalling rounds. The Wi-Fi AC 240 asks the MME 320 registered in the locator 370 about the UE's whereabouts. Further, the MME 320 communicates with involved eNBs 310 via the S1 interface to find either UE specific quality information (when UE is CONNECTED) or average quality information (when UE is IDLE). This solution involves extra signalling since each MME 320 may need to communicate with several eNBs 310 for each specific UE 330 request.

There are also scalability problems that need to be addressed since many UE requests require response from the same locator/MME.

Figure 5:
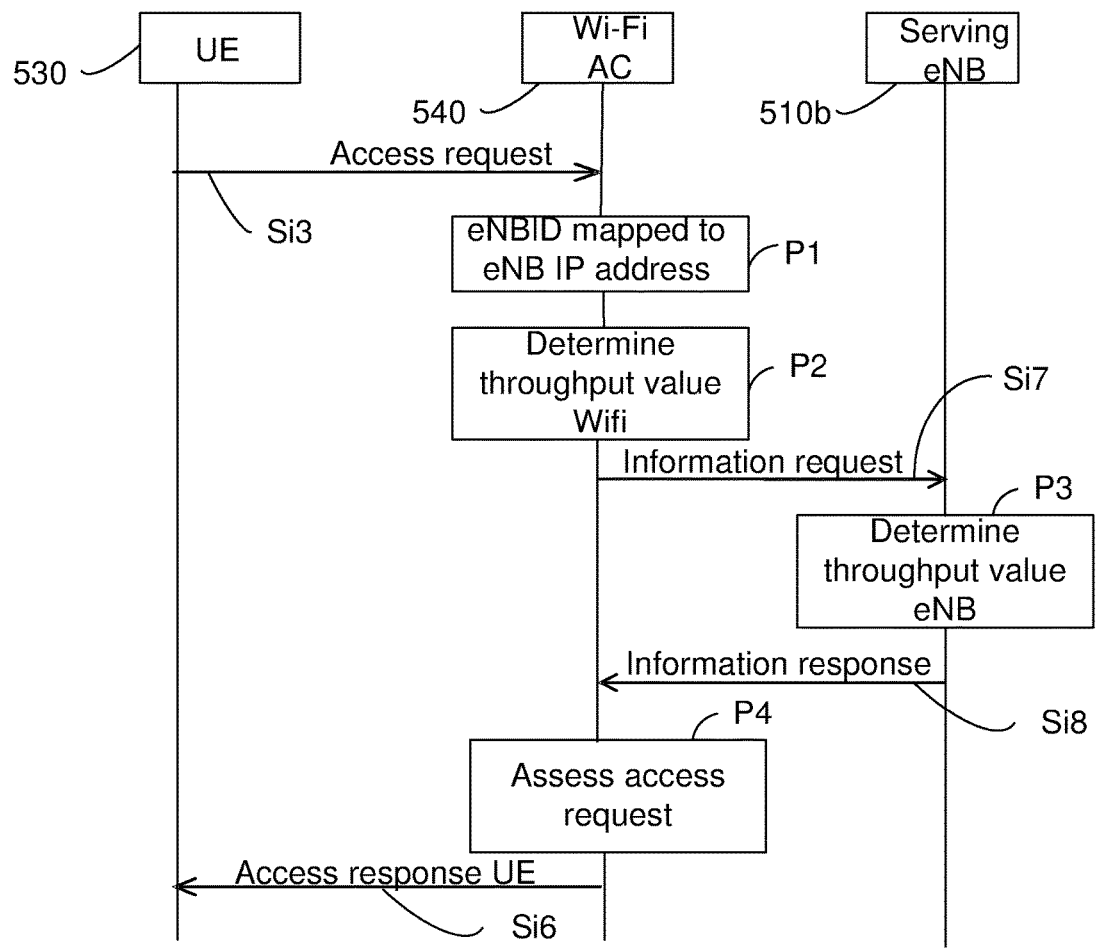
FIG. 5 shows a signal scheme illustrating a second example of a signalling sequence deciding if a User Equipment shall be granted to Wi-Fi cell.

FIGS. 4-6 show different examples of signalling schemes illustrating a method in a radio access controller in a first radio access network and a method in a radio access controller in a second radio access network for providing access control in a wireless network comprising the first radio access network arranged to operate according to a first radio access technology and the second radio access network arranged to operate according to a second radio access technology.

The methods are in one example used for access control when a wireless device requests access to a Wi-Fi network, wherein access can be denied if quality in Wi-Fi is not found to be satisfactory.

The method in the radio access controller of the first radio access network comprises the steps of receiving an access request Si3, Si4 originating from a wireless device, said access request comprising wireless device related information including information related to a global cell identity, assessing P4 the access request, and responding Si5, Si6 to the access request based on the assessment.

The radio access controller is arranged to assess P4 the access request based on the received wireless device related information, a throughput related value for first radio access technology and a throughput related value for the second radio access technology. The step of assessing P4 the access request comprises in one example comparing the throughput related value for the first radio access technology with the throughput related value for second radio access technology.

In one example, the step of assessing comprises communication between the radio access controller and a radio access controller of the second radio access network.

In one example, the first radio access technology is different than the second radio access technology. In one example, the first radio access network is GSM or a WCDMA radio network or an LTE network. In one example, the second radio access network is a Wi-Fi network. In one example, the first radio access network is a Wi-Fi network. In one example, the second radio access network is GSM or a WCDMA radio network or an LTE network.

In one example the global cell identity comprises a serving cell identity.

The global cell identity is in one example an evolved UTRAN Cell Global Identity, ECGI. The ECGI uniquely identifies the cell within Long Term Evolution, LTE, networks. The ECGI comprises the Public Land Mobile Network (PLMN) and the E-Utran Cell identifiers. Both are broadcasted by the cells in the LTE networks.

In one example, the wireless device related information comprises information related to a unique identity of the wireless device.

In one example with LTE, the wireless device 430, 530, 630 is arranged to identify a cell by use of a signal sequence from an enumerated set. In LTE there are 504 signal sequences, each associated to a Physical Cell Identity (PCI). The wireless device knows in which cell it is present, both in a CONNECTED and an IDLE mode.

In one example, the access request originating from the wireless device further comprises the throughput related value for the second radio access technology.

In the illustrated examples of FIGS. 4-6, the access request Si3 from the wireless device in the form of a User Equipment to a Wi-Fi AC comprises the ECGI of the serving cell. In the same message, the UE reports, in one example, a unique identifier of the UE in the eNB of the serving cell. That is, the UE reports the C-RNTI and short MAC-I for the UE in the serving cell. Reporting the unique identity of the UE is for example applicable if the UE is Radio Resource Control, RRC, connected to a eUtran cell. When the UE request access to Wi-Fi when the UE is in IDLE mode in a eUtranCell, the UE does not have a unique identity in eNB during idle mode. In this case, the UE report the ECGI without reporting the C-RNTI and shortMAC-I. Thus, the Wi-Fi AC requests decision from the serving eNB without sending the unique identity of the UE. If the UE is only Wi-Fi capable or is not attached in 3GPP, then ECGI of serving cell is not sent in the access request from the UE to the Wi-Fi AC.

The first and second networks will hereinafter be described in relation to a Wi-Fi network and an LTE network, wherein the Wi-Fi network can be either the first or the second network and wherein the LTE network can be either the first or second radio access network.

In order for the radio access controller of the first radio access network to be able to make the right decision regarding which technology (Wi-Fi or LTE) would offer the best user experience, a Wi-Fi Access Controller, Wi-Fi AC, 440, 540, 640 is arranged to know at least user experience/quality to be offered in the Wi-Fi cell. Further, in one example, the Wi-Fi access controller 440, 540, 640 is in one example also arranged to know the wireless device in the form of a UE 430, 530, 630 is connected to an LTE cell or whether the UE is idle. If the UE is CONNECTED to an LTE cell, the Wi-Fi AC knows in one example UE specific user experience/quality. If the UE is IDLE, the Wi-Fi knows in one example the average user experience/quality in the UE's serving cell. If the UE's serving cell is not possible to determine, the Wi-Fi Ac knows in one example LTE cells covering the Wi-Fi cell.

Thus, the Wi-Fi access controller has information related to the UE's current serving eNB, together with an eNB specific UE Identity (if RRC connected). The radio access controller, which may be the Wi-Fi access controller or a radio access controller of the second radio access network, is arranged to decide on admitting the UE or not into Wi-Fi based on this information.

In the example of FIG. 4, the method for access control comprises the following steps. The Wi-Fi AC 440 receives the access request Si3, processes the access request P1, P2, forms a modified access request Si4 and signals the modified access request Si4 to a serving evolved Node B, eNB 410*b* for assessment P4 of the access request. The eNB signals an access response Si5 to the Wi-Fi AC 440 based on the result of the assessment of the access request. The Wi-Fi AC 440 then signals the result of the assessment in an access response Si6 to the UE 430.

The processing P1, P2 of the access request involves in one example mapping P1 the global serving cell identity to a corresponding serving node IP address for Wi-Fi.

In a detailed example, the Wi-Fi AC 440 extracts the eNB identity from the ECGI. Further, the Wi-Fi AC 440 maps the eNB identity to a preconfigured IP address. The Wi-Fi AC 440 is in one example arranged to contact the eNB without involving a locator. The IP address of the eNB is in one example retrieved from a Domain Name System, DNS, that is capable of performing the mapping between eNB ID and eNB IP address.

The processing P1, P2 of the access request involves in one example determining P2 the throughput value for Wi-Fi.

The throughput value is for example determined as a weighted average per-UE throughput—similar to throughput computation in LTE. The throughput value is in one example given by:
  the average downlink throughput a UE can get in the cell measured over the UEs that were recently active multiplied by
  a weight given by the UE specific data rate based on the measured channel quality for the respective UE, and the average data rate for all UEs in the cell based on their respective channel qualities The modified access request Si4 comprises Wi-Fi network information, said Wi-Fi network information comprising the throughput related value for Wi-Fi. The modified access request is further based on the access request Si3 received from the UE. In one example, the unique identity of the UE is comprised in the modified access request Si4. This makes it possible for the serving eNB to determine P3 the throughput value in the LTE network for the specific UE. The throughput value in the LTE network for the UE is used to decide if the UE has a better user experience in 3GPP or Wi-Fi.

In a detailed example, the Wi-Fi AC 440 requests decision from the serving eNB 310 by sending a Cell Radio Network Temporary Identifier, C-RNTI, and/or a short Medium Access Control Identity, MAC-I, of the UE. In one example, the modified access request is transmitted in an Access Request message to the serving eNB. In the same message, the Wi-Fi throughput information may be sent.

Note that the UE only have a unique identity in an eNB when the UE is in RRC connected mode. If the UE is in IDLE state when requesting access to Wi-Fi then only the serving cell information is sent from UE in the access request S13 to the Wi-Fi AC.

The serving eNB 410*b* determines P3 in one example the throughput value for the eNB 410*b*. The throughput related value for the serving eNB 410*b* is in one example determined P3 as a user specific throughput value based on the information related to the global cell identity and a unique identity of the wireless device. The throughput related value for the serving eNB 410*b* is in one example determined P3 as an average user throughput value based on the information related to the global cell identity.

If the throughput in Wi-Fi cell is better than the LTE cell, then the serving eNB will in the access response Si5 recommend the Wi-Fi AC to admit access to the Wi-Fi cell. Otherwise, the access response will include information that recommends the Wi-Fi AC to deny access to the Wi-Fi cell.

One benefit with this signalling is that no other network nodes are needed to provide UE location information. That is, it is possible for the Wi-Fi AC to connect directly to the serving eNB without involving a locator. This results in lower implementation costs as well as reduced amount of signalling.

Another benefit is that a unique identity of the UE is used in the assessment instead of IMSI. IMSI is not known to an eNB and requires extra signalling in order to be able to get the IMSI for the specific UE.

In an alternative example illustrated in FIG. 5, the method for access control comprises the following steps. The Wi-Fi AC 540 receives the access request Si3, processes the access request P1, P2, forms an information request Si7 and signal the information request Si7 to a serving evolved Node B, eNB 510*b* for a throughput value related to the serving eNB 510*b*. The eNB signals an information response Si8 to the Wi-Fi AC 540 comprising the throughput value related to the serving eNB 510*b*. The Wi-Fi AC then assesses P4 the access request based on the throughput value related to the serving eNB 510b received from the serving eNB 510b. The Wi-Fi AC 540 then signals the result of the assessment in an access response Si6 to the UE 530.

Thus, in order to enable assessment P4 of the access request the following steps are performed: a step, wherein the Wi-Fi controller transmits a request for LTE network information Si7 from the serving eNB, a step of wherein the Wi-Fi controller receives a response to the request for LTE network information Si8 from the serving eNB, wherein said LTE network information comprises the throughput related value provided by the serving eNB for the UE.

In an alternative example illustrated in FIG. 6, the method for access control comprises the following steps. The Wi-Fi AC 640 receives the access request Si3, processes the access request P2, and assesses P4 the access request. The Wi-Fi AC 640 then signals the result of the assessment in an access response Si6 to the UE 630.

The solution involves minimum signalling between network entities. Only the Wi-Fi AC using information provided by the UE is involved in the decision making on whether the UE should or not be granted access to Wi-Fi. Two use cases, one for connected mode and one for idle mode are hereinafter described.

According to this example, the Wi-Fi AC requests the UE to report the throughput value in the UE's serving cell—when the UE is connected in LTE—or the signal quality in the LTE cell where the UE is camping—when the UE is idle in LTE—in the normal positive authentication response to the UE.

In the connected mode use case the UE, when requested by the Wi-Fi AC, reports its throughput in the LTE cell where it is connected. Based on this throughput value, without contacting any other network entity, the Wi-Fi AC will make a decision on whether the UE can be granted access in the Wi-Fi cell.

In the idle mode use case the UE, when requested by the Wi-Fi AC, reports its signal quality in the LTE cell it camps on. If the UE supports carrier aggregation quality in more than one cell could be reported. Based on this information the Wi-Fi AC will estimate a throughput value for this UE. Further, this throughput value is used to make a decision on whether the UE can be granted access in the Wi-Fi cell.

Figure 7:
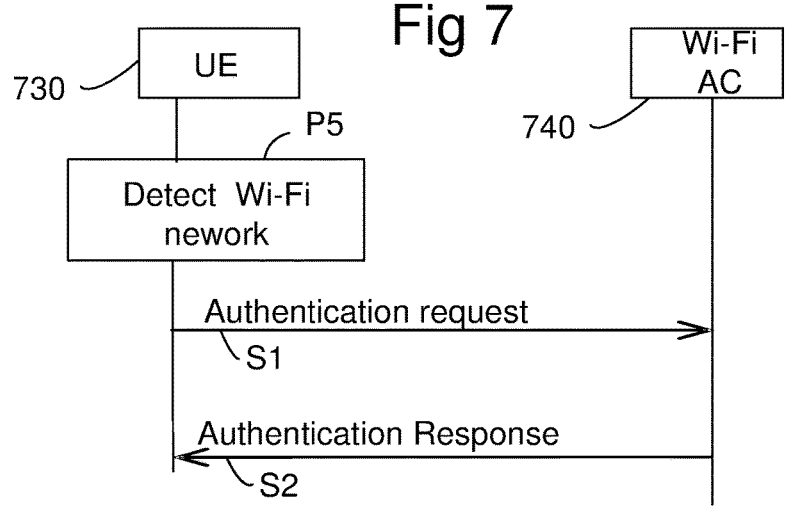
FIG. 7 shows a signalling scheme performed before signalling of an access request.

In FIG. 7, a signalling scheme proceeding signalling of an accept request as described above is illustrated. A user equipment 730 sends an authentication request Si1 to a Wi-Fi access controller 740 of a Wi-Fi network upon detection P5 of said Wi-Fi network. The Wi-Fi AC is then arranged to transmit an authentication response Si2 in response to the authentication request Si1. The authentication response Si2 is in one example a configuration message defining which information to be comprised in the subsequent access request. The authentication response Si2 comprises in one example a request to the UE to report the ECGI of the serving cell. The UE is then arranged to read the ECGI of the serving cell. The reading is in one example performed with use of autonomous gap. In a following access request Si3, the UE then reports the ECGI of the serving cell.

By having the UE to report the ECGI of the serving cell, it is possible to connect from Wi-Fi AC to the eNB without locator.

In one example, the authentication response Si2 comprises a request to the UE to report a unique identity of the UE for the specific serving eNB. The unique identity of the UE is in one example the C-RNTI and/or short MAC-I.

In one example, the authentication response Si2 comprises a request to the UE to report the throughput value associated to the UE's serving cell. In one example, the authentication response Si2 comprises a request to the UE to report the throughput value in the UE's serving cell when the UE is connected in LTE or the signal quality in the LTE cell where the UE is camping when the UE is idle in LTE.

This non-limiting description has been made with reference to a Wi-Fi network and an LTE network. The LTE network is in one example substituted with another radio access network such as GSM or a WCDMA radio network. The radio access controller is then for example a Radio Network Controller, RNC.

In FIG. 8, an interface between an LTE network and a Wi-Fi network is illustrated. A Wi-Fi access controller 840 of the Wi-Fi network is arranged to communicate with an eNB 810 of the LTE network via an interface Sxx. Further, the Wi-Fi AC 840 is arranged to communication with a Wi-Fi access point 841 via an interface. The interface is in the illustrated example a Control And Provisioning of Wireless Access Points, CAP/WAP, protocol.

Figure 9:
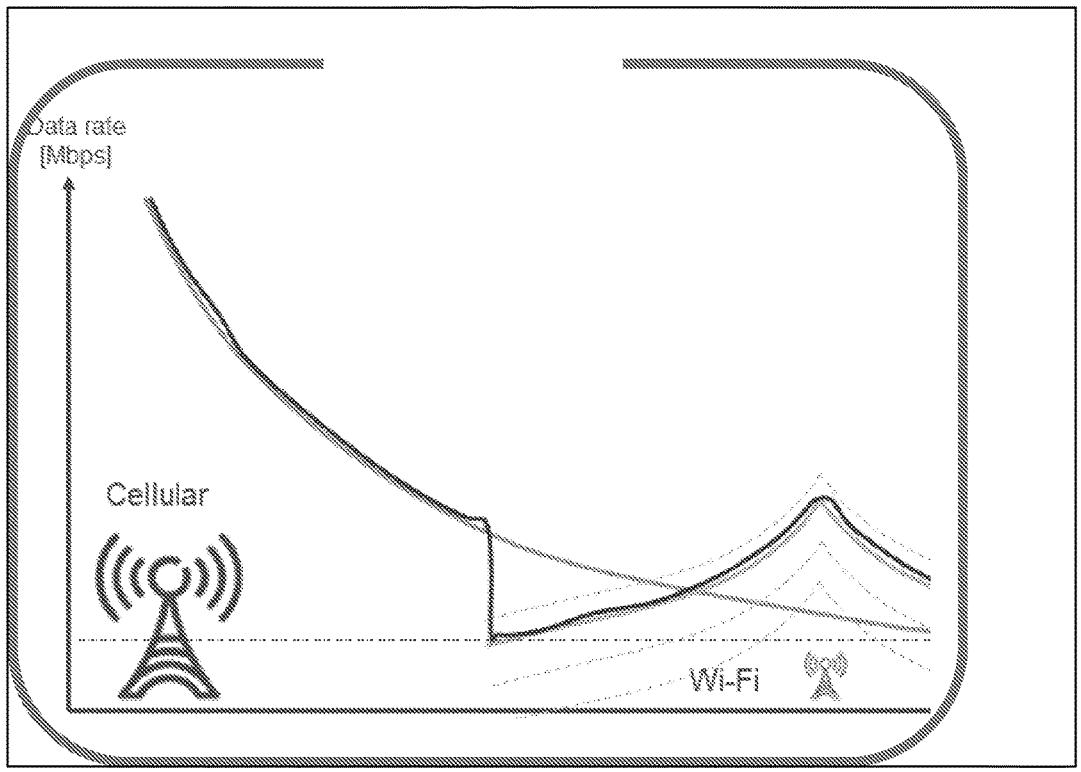
FIG. 9 is a diagram illustrating the performance of an exemplified network described in this disclosure in relation to a prior art network.

In FIG. 9, access control for selection of a Wi-Fi network in relation to a primary radio access network is illustrated in a network according to the present disclosure in relation to a prior art network. The access control as described herein enables access to the Wi-Fi access network only when the throughput in the presently used radio access network decreases below the throughput provided with the Wi-Fi network.

Figure 10:
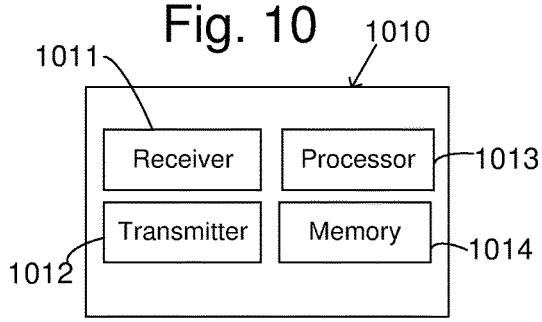
FIG. 10 shows a block scheme illustrating an example of a radio access controller in a first radio access network.

In FIG. 10, a radio access controller 1010 in a first radio access network is arranged to provide access control in a wireless network comprising the first radio access network arranged to operate according to a first radio access technology and a second radio access network arranged to operate according to a second radio access technology. The radio access controller 1010 is in one example arranged to communicate with the second radio access network so as to provide the throughput value for the second radio access technology. The radio access controller 1010 comprises a receiver 1011, a transmitter 1012, a processor 1013 and a memory 1014.

The receiver 1011 is arranged to receive an access request originating from a wireless device. The access request comprises wireless device related information including information related to a global cell identity.

The processor 1013 is arranged to assess the access request based on the received wireless device related information, a throughput related value for the first radio access technology and a throughput related value for the second radio access technology. The processor 1013 is further arranged to form a response to the access request based on the assessment The transmitter 1012 is arranged to transmit the response to the access request.

In one example, the processor 1013 is arranged to form a request for secondary radio access network information from the secondary access network. The transmitter 1012 is then arranged to transmit the formed request for secondary radio access network information. The receiver 1011 is then arranged to receive a response to the request for secondary radio access network information from the secondary access network, wherein said secondary radio access network information comprises the throughput related value for the second radio access technology.

In one example, the processor is arranged to compare the throughput related value for the first radio access technology with the throughput related value for the second radio access technology so as to assess the access request.

In one example, the radio access controller is a Wi-Fi access controller. In one example, the radio access controller is an evolved Node B, eNB. In one example, the radio access controller is a Radio Network Controller, RNC.

Figure 11:
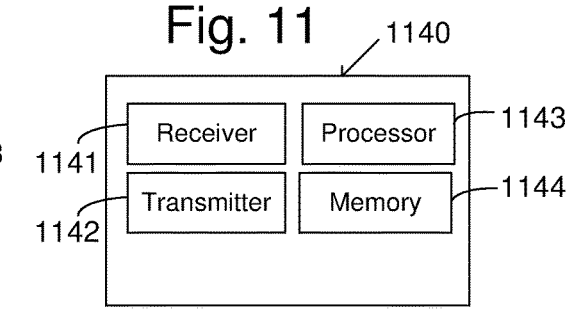
FIG. 11 shows a block scheme illustrating an example of a radio access controller in a second radio access network.

In FIG. 11, a radio network controller 1140 for a second radio access network is arranged to provide access control in a wireless network comprising a first radio access network arranged to operate according to a first radio access technology and the second radio access network arranged to operate according to a second radio access technology. The radio network controller 1140 comprises a transmitter 1142, a receiver 1141, a processor 1143 and a memory 1144.

The receiver 1141 is arranged to receive an access request from the wireless device. The access request comprises wireless device related information including information related to a global cell identity.

The processor 1143 is arranged to determine a throughput related value for the second radio access technology for the wireless device. The throughput related value for the second radio access technology is determined based on the received wireless device related information. The processor 1143 is further arranged to modify the received access request so as to comprise the throughput related value for the second radio access technology from the wireless device.

The transmitter 1142 is arranged to transmit the modified access request to the first radio access network.

The receiver 1141 is further arranged to receiving a response to the modified access request. The response comprises an indication about whether access to the first or the second radio access network is preferred.

In one example, the radio a network controller 1140 is a Wi-Fi access controller.

Figure 12:
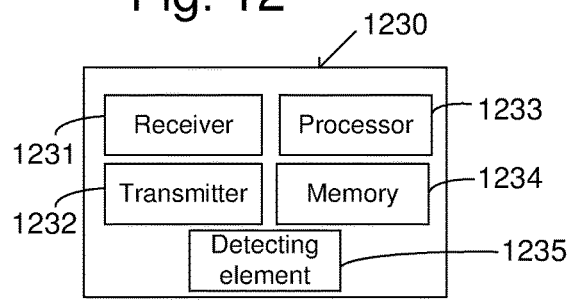
FIG. 12 shows a block scheme illustrating an example of a wireless device.

In FIG. 12, a wireless device 1230 is arranged to provide access control in a wireless network comprising a primary access network and a Wi-Fi network. The wireless device 1230 comprises a receiver 1231, a transmitter 1232, a processor 1233, a memory 1234 and a detecting element 1235 arranged to detect presence of a Wi-Fi network.

The processor 1233 is arranged to form an access request comprising wireless device related information including information related to a global cell identity upon detection of presence of the Wi-Fi network. The transmitter 1232 is arranged to transmit the access request to a Wi-Fi controller of the detected Wi-Fi network. The receiver 1231 is arranged to receive an access response from the Wi-Fi controller. In one example, the wireless device related information comprises a unique identity of the wireless device such as a Cell Radio Network Temporary Identifier, C-RNTI, and/or a short Medium Access Control Identity, MAC-I. In one example, the wireless device related information comprises a throughput related value for the primary network.

A method in the wireless device for providing access control in a wireless network comprising a primary access network and a Wi-Fi network comprises the following steps. In a first step, presence of the Wi-Fi network is detected. An access request is then formed comprising wireless device related information including information related to a global cell identity upon detection of the Wi-Fi network. The access request is transmitted to a Wi-Fi controller of the detected Wi-Fi network. An access response is received from the Wi-Fi controller. The access response comprises information identifying whether the Wi-Fi network or the primary access network is preferred.

| Abbreviation | Explanation |
|---|---|
| 3GPP | 3rd Generation Partnership Project |
| CGI | Cell Global Identity |
| E-UTRAN | Evolved Universal Terrestrial Radio Access Network |
| ECGI | Evolved UTRAN Cell Global Identity |
| eNB | evolved Node B |
| EPC | Evolved Packet Core |
| LTE | Long Term Evolution |
| PCI | Physical Cell Identity |
| PLMN | Public Land Mobile Network |
| RNC | Radio Network Controller |
| UE | User Equipment |
| UTRAN | Universal Terrestrial Radio Access Network |
| Wi-Fi AC | Wi-Fi Access Controller |
| Wi-Fi AP | Wi-Fi Access Point |

The invention claimed is:

1. A method, in a radio access controller in a first radio access network arranged to operate according to a first radio access technology, for providing access control in a wireless network comprising the first radio access network and a second radio access network, the second radio access network being arranged to operate according to a second radio access technology, the method comprising:
   receiving an access request originating from a wireless device, the access request comprising wireless device related information including information related to a global cell identity;
   assessing the access request based on the received wireless device related information, a throughput related value for the first radio access technology and a throughput related value for the second radio access technology, wherein assessing the access request comprises:
      transmitting a request for secondary radio access network information from the secondary access network; and
      receiving a response to the request for secondary radio access network information from the secondary access network, wherein said secondary radio access network information comprises the throughput related value for the second radio access technology; and
   responding to the access request based on the assessment.

2. The method of claim 1, wherein the assessing comprises communication with the second radio access network.

3. The method of claim 1, wherein the access request originating from the wireless device further comprises the throughput related value for the second radio access technology.

4. The method of claim 1, wherein the assessing the access request comprises comparing the throughput related value for the first radio access technology with the throughput related value for the second radio access technology.

5. The method of claim 1, wherein the first radio access network is a Wi-Fi network.

6. The method of claim 5, wherein the method further comprises mapping the global serving cell identity to a corresponding serving node IP address for Wi-Fi.

7. A method, in a radio access controller in a first radio access network arranged to operate according to a first radio access technology, for providing access control in a wireless network comprising the first radio access network and a second radio access network, the second radio access network being arranged to operate according to a second radio access technology, the method comprising:

receiving an access request originating from a wireless device, the access request comprising wireless device related information including information related to a global cell identity;

assessing the access request based on the received wireless device related information, a throughput related value for the first radio access technology and a throughput related value for the second radio access technology, wherein the throughput related value for the first radio access technology is determined as an average user throughput value based on the information related to the global cell identity; and responding to the access request based on the assessment.

8. A method, in a radio access controller in a first radio access network arranged to operate according to a first radio access technology, for providing access control in a wireless network comprising the first radio access network and a second radio access network, the second radio access network being arranged to operate according to a second radio access technology, the method comprising:

receiving an access request originating from a wireless device, the access request comprising wireless device related information including information related to a global cell identity;

assessing the access request based on the received wireless device related information, a throughput related value for the first radio access technology and a throughput related value for the second radio access technology, wherein the throughput related value for the first radio access technology is determined as a user specific throughput value based on the information related to the global cell identity and a unique identity of the wireless device; and responding to the access request based on the assessment.

9. A method, in a radio network controller in a second radio access network arranged to operate according to a second radio access technology, for providing access control in a wireless network comprising a first radio access network arranged to operate according to a first radio access technology and the second radio access network, the method comprising:

receiving an access request from the wireless device, the access request comprising wireless device related information including information related to a global cell identity;

determining a throughput related value for the second radio access technology for the wireless device based on the received wireless device related information;

modifying the received access request so as to comprise the throughput related value for the second radio access technology from the wireless device;

transmitting the modified access request to the first radio access network; and receiving a response to the modified access request, the response comprising an indication about whether access to the first or the second radio access network is preferred.

10. The method of claim 9, wherein the second radio access network is a Wi-Fi network.

11. A radio access controller configured for use in a first radio access network arranged to operate according to a first radio access technology, the radio access controller being arranged to provide access control in a wireless network comprising the first radio access network and a second radio access network arranged to operate according to a second radio access technology, the radio access controller comprising:

a receiver configured to receive an access request originating from a wireless device, said access request comprising wireless device related information including information related to a global cell identity;

a processor configured to assess the access request based on the received wireless device related information, a throughput related value for the first radio access technology and a throughput related value for the second radio access technology, and to form a response to the access request based on the assessment; and a transmitter arranged to transmit the response to the access request, wherein the processor is configured to form a request for secondary radio access network information from the secondary access network, the transmitter is configured to transmit the formed request for secondary radio access network information, and the receiver is configured to receive a response to the request for secondary radio access network information from the secondary access network, wherein said secondary radio access network information comprises the throughput related value for the second radio access technology.

12. The radio access controller of claim 11, being further configured to communicate with the second radio access network so as to provide the throughput value for the second radio access technology.

13. The radio access controller of claim 11, wherein the processor is configured to compare the throughput related value for the first radio access technology with the throughput related value for the second radio access technology, so as to assess the access request.

14. The radio access controller of claim 11, wherein the radio access controller is a Wi-Fi access controller.

15. The radio access controller of claim 11, wherein the radio access controller is an evolved Node B (eNB).

16. The radio access controller of claim 11, wherein the radio access controller is a Radio Network Controller (RNC).

17. A radio network controller arranged for operation in a second radio access network arranged to operate according to a second radio access network, and further arranged to provide access control in a wireless network comprising a first radio access network arranged to operate according to a first radio access technology and the second radio access network, the radio network controller comprising:

a receiver configured to receive an access request from the wireless device, the access request comprising wireless device related information including information related to a global cell identity;

a processor configured to determine a throughput related value for the second radio access technology for the wireless device based on the received wireless device related information, and to modify the received access request so as to comprise the throughput related value for the second radio access technology from the wireless device; and a transmitter configured to transmit the modified access request to the first radio access network;

wherein the receiver is further arranged to receive a response to the modified access request, the response comprising an indication of whether access to the first or the second radio access network is preferred.

18. The radio network controller of claim 17, wherein the radio network controller is a Wi-Fi access controller.

* * * * *